US007817062B1

(12) United States Patent
Li et al.

(10) Patent No.: US 7,817,062 B1
(45) Date of Patent: Oct. 19, 2010

(54) SURFACE COMMUNICATION APPARATUS AND METHOD FOR USE WITH DRILL STRING TELEMETRY

(75) Inventors: Qiming Li, Sugar Land, TX (US); David Santoso, Sugar Land, TX (US); Mark Sherman, Houston, TX (US); Raghu Madhavan, Houston, TX (US); Randall P. LeBlanc, Katy, TX (US); John A. Thomas, Porter, TX (US); Joseph Montero, Stafford, TX (US)

(73) Assignee: Intelliserv, LLC., Houston, TX (US)

( * ) Notice: Subject to any disclaimer, the term of this patent is extended or adjusted under 35 U.S.C. 154(b) by 0 days.

(21) Appl. No.: 12/787,103

(22) Filed: May 25, 2010

Related U.S. Application Data

(62) Division of application No. 11/498,847, filed on Aug. 3, 2006.

(60) Provisional application No. 60/705,326, filed on Aug. 4, 2005, provisional application No. 60/708,561, filed on Aug. 16, 2005.

(51) Int. Cl.
*G01V 3/00* (2006.01)
(52) U.S. Cl. .................. 340/855.8; 310/96; 310/155
(58) Field of Classification Search ............... 340/855.8; 310/96, 117, 155, 168
See application file for complete search history.

(56) References Cited

U.S. PATENT DOCUMENTS

| 4,407,374 | A | * | 10/1983 | Wallussek et al. | ............ | 175/24 |
|---|---|---|---|---|---|---|
| 4,491,738 | A | * | 1/1985 | Kamp | ............ | 290/43 |
| 7,687,950 | B2 | * | 3/2010 | Kuckes | ............ | 310/87 |
| 2005/0024231 | A1 | * | 2/2005 | Fincher et al. | ............ | 340/854.4 |
| 2005/0200210 | A1 | * | 9/2005 | Kotsonis et al. | ............ | 310/15 |
| 2008/0247273 | A1 | * | 10/2008 | Chemali et al. | ............ | 367/82 |

* cited by examiner

*Primary Examiner*—Timothy Edwards, Jr.
(74) *Attorney, Agent, or Firm*—Conley Rose, P.C.

(57) ABSTRACT

An operation of drilling an earth borehole uses a drilling rig, a drill string of drill pipes having its generally upper end mechanically coupleable with and suspendable from the drilling rig, a drive string portion of the drill string, mechanically coupleable with the topmost drill pipe of said drill string, and a drive mechanism mechanically coupleable with the drive string for rotating the drive string and the drill string. A system for generating electric power in the region of the drive string includes an electric generator, which includes a rotating generator component mounted on said drive string for rotation therewith and a stationary generator component mounted on a stationary portion of the drilling rig. The rotating generator component produces electric power in the region of the drive string.

12 Claims, 5 Drawing Sheets

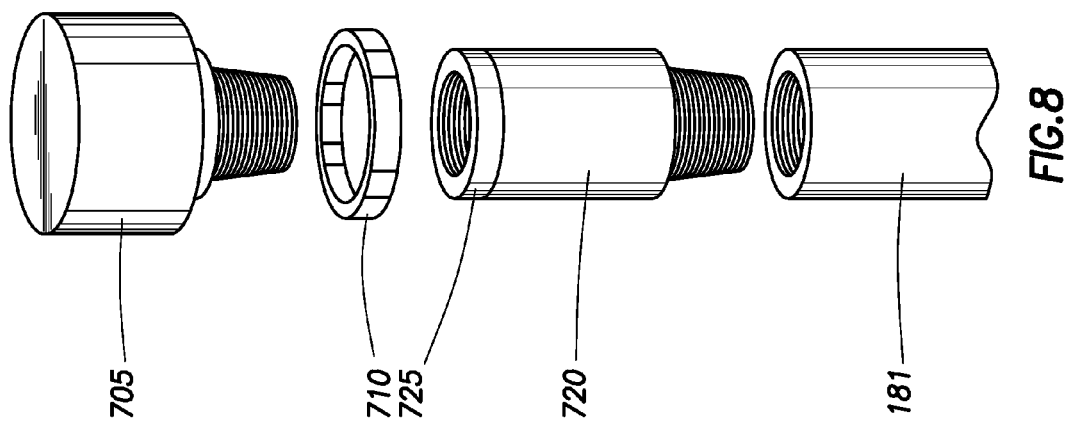
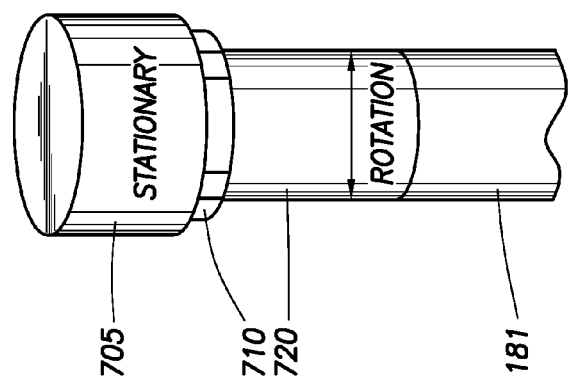

SURFACE COMMUNICATION APPARATUS AND METHOD FOR USE WITH DRILL STRING TELEMETRY

CROSS-REFERENCE TO RELATED APPLICATIONS

The present Application is a divisional of U.S. application Ser. No. 11/498,847 filed Aug. 3, 2006, and claims priority from U.S. Provisional Patent Application No. 60/705,326, filed Aug. 4, 2005, and also claims priority from U.S. Provisional Patent Application No. 60/708,561, filed Aug. 16, 2005, and both said U.S. Provisional Patent Applications are incorporated herein by reference. The present Application contains subject matter that relates to subject matter disclosed in copending U.S. patent application Ser. Nos. 11/498,845, titled "Bidirectional Drill String Telemetry for Measuring and Drilling Control," (hereinafter "the '845 Application") and 11/995,027, titled "Interface and Method for Wellbore Telemetry System" (hereinafter "the '027 Application"), both filed on Aug. 3, 2006 of even date herewith, and both assigned to the same assignee as the present Application.

STATEMENT REGARDING FEDERALLY SPONSORED RESEARCH OR DEVELOPMENT

Not applicable.

BACKGROUND

This invention relates to the fields of drilling and producing hydrocarbon wells, and to the measuring of downhole formation characteristics, and to drill string telemetry for bidirectional communication of measurement and control information between dowhhole and surface equipment, and to a surface communication system for bidirectional communication between drill string telemetry and a surface processor.

The advent of measurement while drilling (MWD) and logging while drilling (LWD), as well as development of surface control of special drilling processes, such as directional drilling, have been important advances in the art of drilling and producing hydrocarbon wells. These processes require communication, in both directions, between the surface and the downhole measuring and drilling equipment. At present, mud pulse telemetry is the only technique in widespread commercial use for communication while drilling, between downhole equipment and the surface. [Unless otherwise indicated, references, throughout, to "while drilling," or the like, are intended to mean that the drill string is in the borehole or partially in the borehole as part of an overall drilling operation including drilling, pausing, and or tripping, and not necessarily that a drill bit is rotating.] In mud pulse telemetry, data is transmitted as pressure pulses in the drilling fluid. However, mud pulse telemetry has well known limitations, including relatively slow communication, low data rates, and marginal reliability. Current mud pulse technology is capable of sending MWD/LWD data at only about 12 bits per second. In many cases, this rate is insufficient to send all the data that is gathered by an LWD tool string, or is limiting on the configuration of a desired tool string. Also, mud pulse technology does not work well in extended reach boreholes. Signaling from uphole to downhole, by regulating mud pump flow, in order to control processes such as directional drilling and tool functions, is also slow, and has a very low information rate. Also, under certain circumstances, for example underbalanced drilling employing gases or foamed drilling fluid, current mud pulse telemetry cannot function.

There have been various attempts over the years to develop alternatives to mud pulse telemetry that are faster, have higher data rates, and do not require the presence of a particular type of drilling fluid. For example, acoustic telemetry has been proposed, which transmits acoustic waves through the drill string. Data rates are estimated to be about an order of magnitude higher than mud pulse telemetry, but still limiting, and noise is a problem. Acoustic telemetry has not yet become commercially available. Another example is electromagnetic telemetry through the earth. This technique is considered to have limited range, depends on characteristics, especially resistivity, of the formations surrounding the borehole, and also has limited data rates.

The placement of wires in drill pipes for carrying signals has long been proposed. Some early approaches to a wired drill string are disclosed in: U.S. Pat. No. 4,126,848, U.S. Pat. No. 3,957,118 and U.S. Pat. No. 3,807,502, and the publication "Four Different Systems Used for MWD," W. J. McDonald, The Oil and Gas Journal, pages 115-124, Apr. 3, 1978.

The idea of using inductive couplers, such as at the pipe joints, has also been proposed. The following disclose use of inductive couplers in a drill string: U.S. Pat. No. 4,605,268, Russian Federation published patent application 2140527, filed Dec. 18, 1997, Russian Federation published patent application 2040691, filed Feb. 14, 1992, and WO Publication 90/14497A2, Also see: U.S. Pat. No. 5,052,941, U.S. Pat. No. 4,806,928, U.S. Pat. No. 4,901,069, U.S. Pat. No. 5,531,592, U.S. Pat. No. 5,278,550, and U.S. Pat. No. 5,971,072.

The U.S. Pat. No. 6,641,434 describes a wired drill pipe joint that was a significant advance in the wired drill pipe art for reliably transmitting measurement data in high-data rates, bidirectionally, between a surface station and locations in the borehole. The '434 Patent discloses a low-loss wired pipe joint in which conductive layers reduce signal energy losses over the length of the drill string by reducing resistive losses and flux losses at each inductive coupler. The wired pipe joint is robust in that it remains operational in the presence of gaps in the conductive layer. The performance attendant these and other advances in the drill string telemetry art provides opportunity for innovation where prior shortcomings of range, speed, and data rate have previously been limiting on system performance.

When a wired drill pipe system is used, it is necessary to have a communication link between the topmost wired drill pipe and a surface processor (which, inter alia, typically performs one or more of the following functions: receiving and/or sending data, logging information, and/or control information to and/or from downhole and surface equipment, performing computations and analyses, and communicating with operators and with remote locations). Various approaches have been suggested, some of which are summarized in U.S. Pat. No. 7,040,415, including use of a slip ring device, and use of rotary electric couplings based on induction or so-called transformer action. A slip ring (also known as brush contact surfaces) is a well known electrical connector designed to carry current or signals from a stationary wire into a rotating device. Typically, it is comprised of a stationary graphite or metal contact (a brush) carried in a non-rotating component which rubs on the outside diameter of a rotating metal ring (e.g., carried on the upper portion of a kelly joint). As the metal ring turns, the electrical current or signal is conducted through the stationary brush to the metal ring making the connection.

Rotary electrical couplings based on induction (transformer action), known, as rotary transformers, provide an alternative to slip rings and contact brushes based upon conduction between rotating and stationary circuitry, so no direct contact is necessary. The transformer windings comprise a stationary coil and a rotating coil, both concentric with the axis of rotation. Either coil can serve as the primary winding with the other serving as the secondary winding.

These types of approaches for surface communication have certain limitations and drawbacks attendant the use of complex electromechanical structures, and it is among the objects of the present invention to provide a system for bidirectional communication of signals between the topmost wired drill pipe and a surface processor, with improved efficiency and reliability.

A further aspect of the drilling and measurement art that is addressed herein relates to safety at the wellsite, and the problem of powering a rotating assembly, at a location that may be classified as a hazardous area, without the use of power carrying wires. Existing techniques have certain limitations. For example, mud turbines, which are powered by the moving drilling fluid, are relatively complex and expensive to build and to maintain. The use of ordinary batteries can be problematic when the drilling operation must be interrupted for battery replacement. It is accordingly among the further objects hereof to provide a safe, efficient, and reliable source of electric power in conjunction with the rotating drill string.

SUMMARY OF THE INVENTION

It has been recognized that wireless surface communication could be used for communication between a drill string telemetry system and a surface processor (see, for example, U.S. Pat. No. 7,040,415). However, the manner in which this can be advantageously achieved has not heretofore been realized.

A form of the invention is directed for use in an operation of drilling an earth borehole using: a drilling rig, a drill string having its generally upper end mechanically coupleable with and suspendable from the drilling rig, and downhole equipment on the drill string. A system is provided for bidirectional communication between the downhole equipment and a processor subsystem at the earth's surface, comprising: a section of wired drill pipes comprising at least the upper portion of the string of drill pipes, and forming at least a portion of a bidirectional communication link between the downhole equipment and the top of the string of drill pipes; a drive string portion of the drill string, mechanically coupleable with the topmost wired drill pipe; a drive mechanism mechanically coupleable with said drive string portion, for rotating the drill string; a first wireless transceiver subsystem mounted on the drive string portion of the drill string, for rotation in conjunction with the drill string; a cable, electrically coupled between the top joint of the topmost wired drill pipe and the first transceiver subsystem; and a second wireless transceiver subsystem coupled with the uphole processor subsystem, the second wireless transceiver subsystem communicating bidirectionally with the first wireless transceiver subsystem. [As used herein, the "drive string" portion of the drill string comprises all subs, kelly, top drive, or the like that are connected above the topmost drill pipe of the drill string. In illustrated embodiments hereof; the topmost drill pipe is also the topmost wired drill pipe of the drill string.]

Although, in some circumstances, a single wire could be used, in a preferred embodiment of the invention, the cable comprises a plurality of wires, such as a wire pair. In a form of this embodiment, the section of wired drill pipe has inductive couplers at the joints of each pipe, and the cable is electrically coupled to the top joint of said topmost wired drill pipe by an inductive coupling. Also, in a preferred embodiment of the invention, the first transceiver subsystem includes a first antenna subsystem, and the second transceiver subsystem includes a second antenna subsystem. Each of the antenna subsystems can comprise a plurality of antennas. The antennas can be at different azimuthal positions with respect to the drive string.

In one embodiment of the invention, the drive string portion of the drill string comprises a kelly, and in a form of this embodiment, the drive string portion of the drill string further comprises a saver sub between the kelly and the topmost wired drill pipe. In another embodiment of the invention, the drive string portion of the drill string comprises a top drive sub, and the drive mechanism comprises a top drive that engages the top drive sub. In a form of this embodiment, the drive string portion of the drill string further comprises a saver sub between the top drive sub and said topmost wired drill pipe.

In an embodiment of the invention, an antenna of the first antenna subsystem and the first wireless transceiver subsystem are mounted at substantially the same position on the drive string portion of the drill string, and in another embodiment, an antenna of the first antenna subsystem and at least part of said first wireless transceiver subsystem are mounted at respectively different positions on the drive string portion of the drill string.

In accordance with a further form of the invention, an electric generator is provided for generating electric power for use by the first transceiver subsystem, the electric generator including a rotating generator component that is mounted on the drive string portion of the drill string and a stationary generator component that is mounted on a stationary portion of the drilling rig. In an embodiment of this form of the invention, the stationary generator component comprises a ring of magnets, and the rotating generator component comprises at least one stator coil. The rotating generator component and stationary generator component are disposed in close proximity such that magnetic flux from the ring of magnets crosses the at least one stator coil.

Further features and advantages of the invention will become more readily apparent from the following detailed description when taken in conjunction with the accompanying drawings.

BRIEF DESCRIPTION OF THE DRAWINGS

FIG. 7 is a diagram of an electric power generating subsystem in accordance with an embodiment of the invention.

FIG. 8 is an exploded diagram of the FIG. 8 electric power generating subsystem in accordance with an embodiment of the invention.

DETAILED DESCRIPTION

Figure 1:
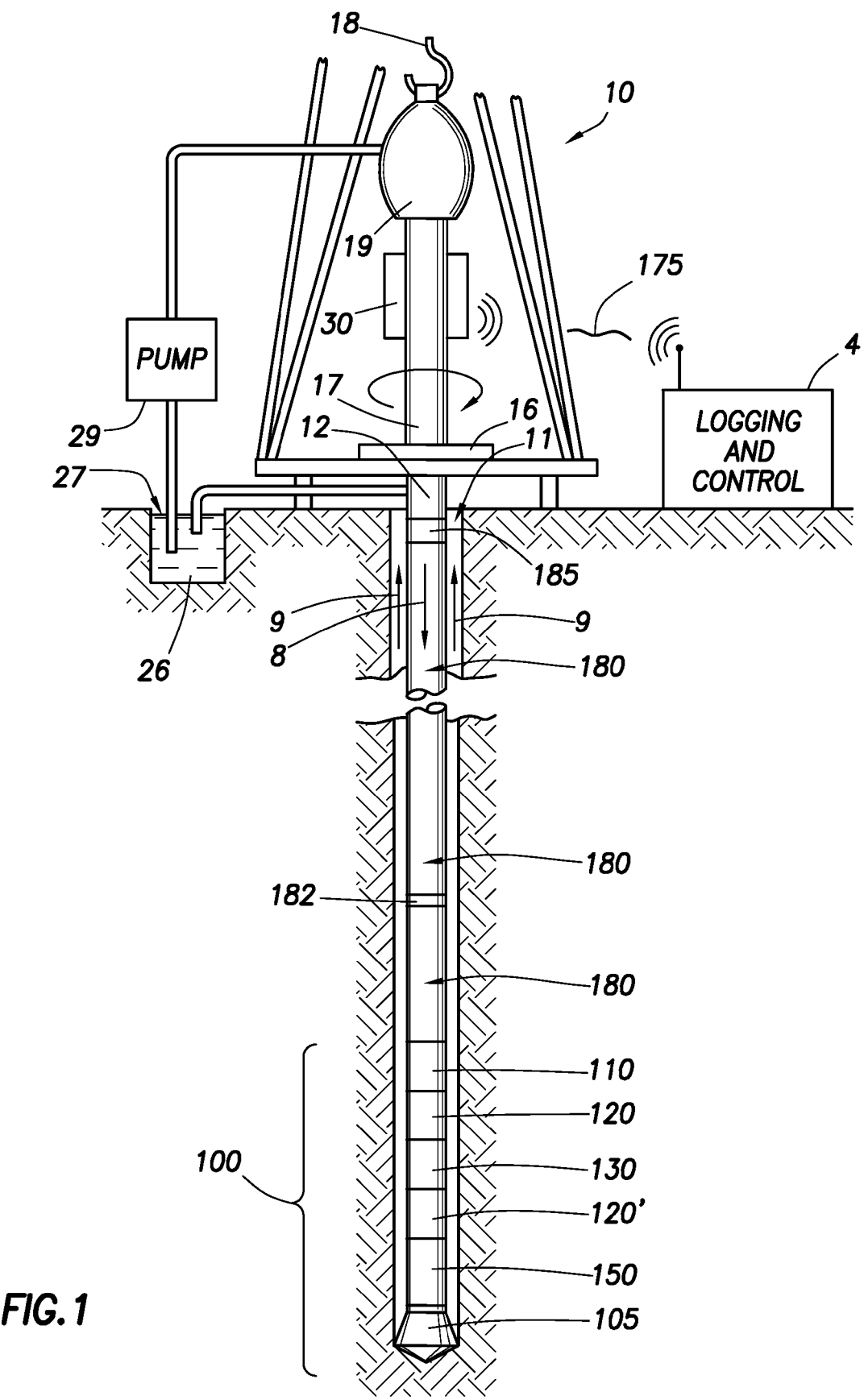
FIG. 1 is a diagram, partially in schematic form and partially in block form, of a system in which embodiments of the invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. The drilling could alternatively be mud-motor based directional drilling, as is also well known.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 15 and carries formation cuttings up to the surface as it is returned to the pit 27 for recirculation.

As is known in the art, sensors may be provided about the wellsite to collect data, preferably in real time, concerning the operation of the wellsite, as well as conditions at the wellsite. For example, such surface sensors may be provided to measure parameters such as standpipe pressure, hookload, depth, surface torque, rotary rpm, among others.

The bottom hole assembly 100 of the illustrated embodiment includes an interface sub 110, a logging-while-drilling (LWD) module 120, a measuring-while-drilling (MWD) module 130, a roto-steerable system and motor 150 for directional drilling, and drill bit 105.

The LWD module 120 is housed in a special type of drill collar, as is known in the art, and can contain one or a plurality of known types of logging tools. (See also the above-referenced copending U.S. patent application Ser. No. 11/498,845, filed of even date herewith and assigned to the same assignee as the present application.) The LWD module includes capabilities for measuring, processing, and storing information, as well as for communicating with the surface equipment. The LWD module can include, for example, one or more of the following types of logging devices that measure formation characteristics: a resistivity measuring device, a directional resistivity measuring device, a sonic measuring device, a nuclear measuring device, a nuclear magnetic resonance measuring device, a pressure measuring device, a seismic measuring device, an imaging device, and a formation sampling device.

The MWD module 130 is also housed in a special type of drill collar, as is known in the art, and can contain one or more devices for measuring characteristics of the drill string and drill bit. The MWD tool can further include an apparatus (not shown) for generating electrical power to the downhole system. This may typically include a mud turbine generator powered by the flow of the drilling fluid, although other power and/or battery systems may be employed. The MWD module can include, for example, one or more of the following types of measuring devices: a weight-on-bit measuring device, a torque measuring device, a vibration measuring device, a shock measuring device, a stick slip measuring device, a direction measuring device, and an inclination measuring device.

In the system of FIG. 1, a drill string telemetry system is employed which, in the illustrated embodiment, comprises a system of inductively coupled wired drill pipes 180 that extend from a surface sub 185 to an interface sub 110 in the bottom hole assembly. Depending on factors including the length of the drill string, relay subs or repeaters can be provided at intervals in the string of wired drill pipes, an example being represented at 182. The relay subs, which can also be provided with sensors, are further described in the '027 Application.

The interface sub 110 provides an interface between the communications circuitry of the LWD and MWD modules and the drill string telemetry system which, in this embodiment, comprises wired drill pipes with inductive couplers. The interface sub 110, which can also be provided with sensors, is described further in the '027 Application.

At the top of the wired drill string, a further interface sub 185, can be provided, and serves, in this case, as a surface sub. As described, for example, in the U.S. Pat. No. 7,040,415, the wired drill pipes can be coupled with electronics subsystem that rotates with kelly 17 and include a transceiver and antenna that communicate bidirectionally with antenna and transceiver of logging and control unit 4 which, in the present embodiment, embodies the uphole processor subsystem. In an embodiment hereof, the interface sub 185 can comprise a wired saver sub (to be described), and the electronics of a transceiver 30 is mounted on the kelly, or other part of the drive string, as will be described. In FIG. 1, a communication link 175 is schematically depicted between the electronics subsystem 30 and antenna of the logging and control unit 4. Accordingly, the configuration of FIG. 1 provides a communication link from the logging and control unit 4 through communication link 175, to surface sub 185, through the wired drill pipe telemetry system, to downhole interface 110 and the components of the bottom hole assembly and, also, the reverse thereof, for bidirectional operation.

As described in the '027 Application while only one logging and control unit 4 at one wellsite is shown, one or more surface units across one or more wellsites may be provided. The surface units may be linked to one or more surface interfaces using a wired or wireless connection via one or more communication lines. The communication topology between the surface interface and the surface system can be point-to-point, point-to-multipoint or multipoint-to-point. The wired connection includes the use of any type of cables (wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc.

Figure 2:
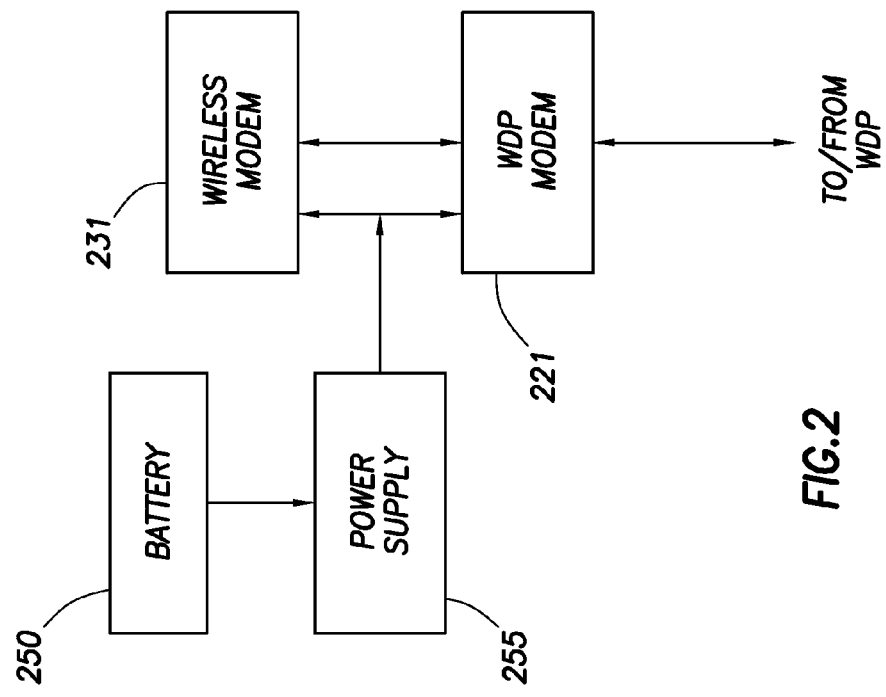
FIG. 2 is a diagram, partially in block form, of an existing scheme for bidirectional wireless communication between a surface communication sub and a surface computer.

FIG. 2 shows a block diagram of a type of wireless transceiver subsystem electronics that can be used for the electronics 30 of FIG. 1. Reference can also be made to U.S. Pat. No. 7,040,415. A signal from/to the inductive coupler of the top joint of topmost wired drill pipe is coupled with a WDP modem. The WDP modem 221 is, in turn, coupled with wireless modem 231. A battery 250 and power supply 255 are also provided to power the modems. Other power generating means, which may be more preferred, are described hereinbelow. The logging and control unit also has, for example, a transceiver with a wireless modem.

The WDP surface modem is adapted to communicate with one or more modems, repeaters, or other interfaces in the downhole tool via the wired drill pipe telemetry system. Preferably, the modems provide two way communications. The modem communicates with another modem or repeater or other sub located in the downhole tool. Any kind of digital and analog modulation scheme may be used, such as biphase, frequency shift keying (FSK), quadrature phase shift-keying (QPSK), Quadrature Amplitude Modulation (QAM), discrete multi tone (DMT), etc. These schemes may be used in combination with any kind of data multiplexing technologies such as Time Division Multiplexing (TDM), Frequency Division Multiplexing (FDM), etc. The modem may include functionality for drill pipe diagnostics and downhole tool diagnostics.

Although a single surface processor is depicted, it will be understood that plural surface processors, in the form of logging/control units or other forms, can be provided at diverse locations, with wired and/or wireless transceiver connection, it being further understood that any of the modes of communication mentioned herein can be utilized, and that compression and/or encryption of data can also be utilized. Each unit can have its own antenna(s) and/or shared antennas. The antennas can be provided at optimum locations and with optimum orientations to maximize signal strength and quality. Communication to/from remote locations, including communication via satellite, can also be implemented.

Figure 3:
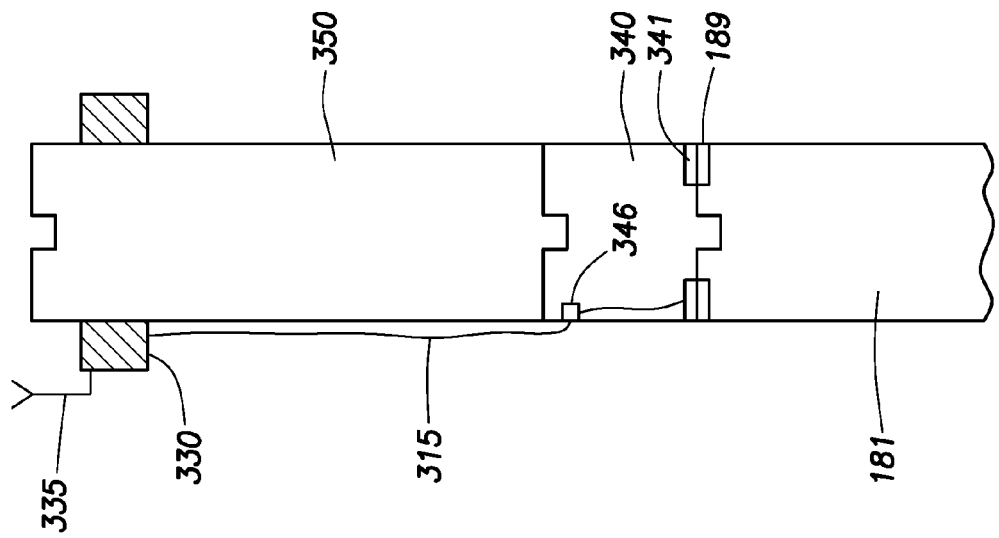
FIG. 3 is a cross-sectional schematic diagram, partially in block form, of a bidirectional surface communication subsystem in accordance with an embodiment of the invention.

FIG. 3 shows an embodiment of the invention in which a special saver sub 340 is provided between the kelly 350 and the topmost wired drill pipe 181. The saver sub 340 has an inductive coupler 341 at its lower end that electrically couples with the inductive coupler 189 of the topmost wired drill pipe. A cable 315, which is connected to inductive coupler 341, exits saver sub 340 through a sealed port, and runs externally of kelly 350 to the transceiver subsystem 330, which includes antenna(s) 335. At the exit position of the cable on the saver sub 340, a connector 346 can be provided. The cable running along the outside of kelly 350 can be sealed in a groove in the kelly and, for example, be protected by an epoxy or peek materials. A further connector can be provided at the transceiver subsystem electronics. The cable 315 is provided with at least a wire pair.

Figure 4:
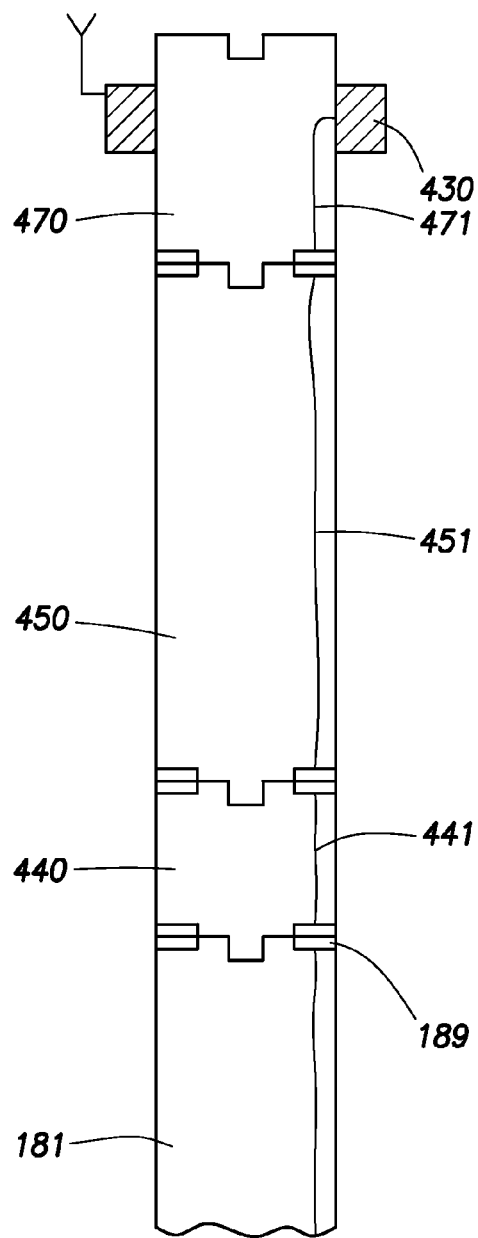
FIG. 4 is a cross-sectional schematic diagram, partially in block form, of a bidirectional surface communication subsystem in accordance with another embodiment of the invention.

In the embodiment of FIG. 4, the saver sub 440 and kelly 450 have internal electrical cabling, and the drive string includes a special top sub 470, above kelly 450, on which the wireless transceiver subsystem 430 is mounted. In a form of this embodiment, the saver sub 440 and the kelly 450 each have inductive couplers at both ends, with a cable (again, and throughout, preferably including at least a wire pair), designated 441 and 451, respectively, running between the ends of each. It will be understood that other types of coupling at the joints could alternatively be used, here, and in other embodiments. The special top sub 470, which is mounted above kelly 450, rotates with the drill string. In this example, the top sub 470 has an inductive coupler at its lower end, and an internal cable 471 that couples with the wireless transceiver subsystem 430.

Figure 5:
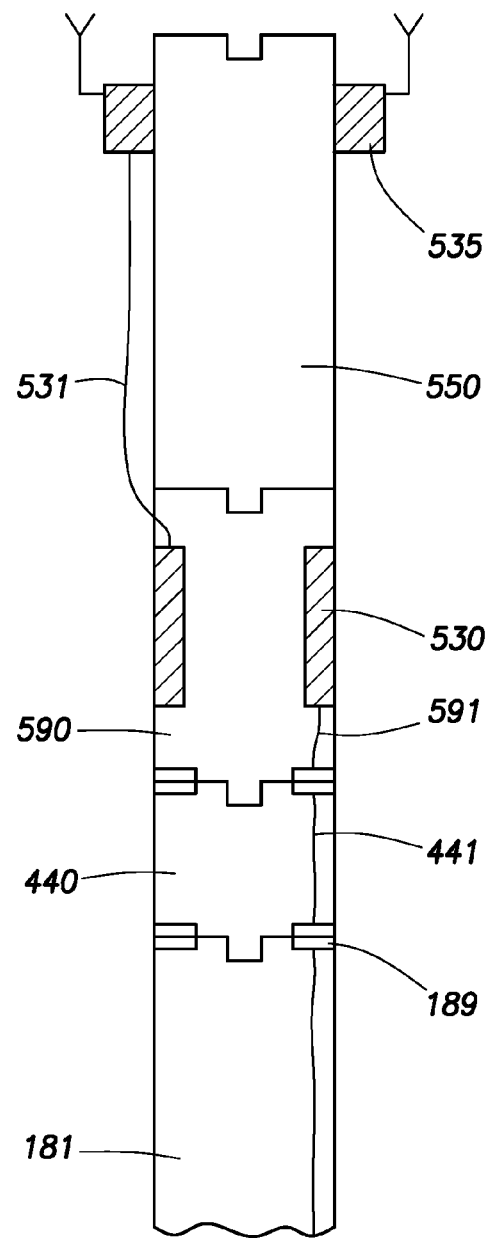
FIG. 5 is a cross-sectional schematic diagram, partially in block form, of a bidirectional surface communication subsystem in accordance with a further embodiment of the invention.

In the examples of the embodiments of FIGS. 3 and 4, the wireless transceiver subsystem electronics, as well as the associated antenna(s), are in one general location on the drive string portion of the drill string, but, it will be understood that parts or all of the electronics, with contiguous or separated antenna(s), can be at a plurality of locations. For example, in the embodiment of FIG. 5, a special surface sub 590 is employed between saver sub 440 and kelly 550. In this example, the saver sub 440 has inductive couplers at both ends and internal wiring (as in FIG. 4), and the special surface sub 590 has an inductive coupler at its lower end, with internal wiring, represented at 591, running to the electronics 530. In this example, the wireless transceiver subsystem electronics 530, or at least a portion thereof, are mounted internally in the special surface sub 590. An example of internal packaging of electronics in a sub is shown in the '027 Application filed of even date herewith, and assigned to the same assignee as the present application. In the present embodiment, the antenna(s) 535 (and, if desired, a portion of the associated electronics) are mounted on the kelly 550 and coupled with the rest of the electronics 530 via cable 531 which, in this embodiment, exits the special sub 590 at a sealed port or connector, and can be carried in a groove in the kelly in the same manner as was described above. If desired, the bidirectional link between electronics 530 and antenna(s)/electronics 535 can carry a digitized signal. In this embodiment, it will be understood that the sub 590 and a portion of kelly 550 may be under the level of the mud at least some of the time, but the antenna(s)/electronics 535 will be above the mud level. FIG. 5 shows plural antennas that rotate with the kelly, as it will be understood that azimuthally redundant antennas on the rotating drive string will minimize dead spots or weak spots of the wireless link. The same is applicable to the other embodiments. Also, plural antennas of the wireless transceiver subsystem can be advantageous.

Figure 6:
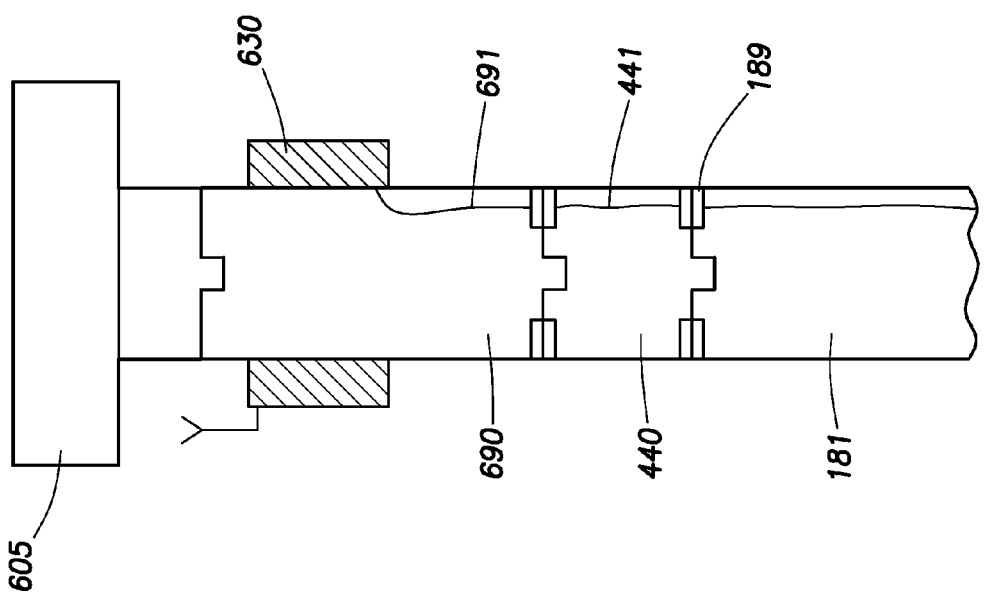
FIG. 6 is a cross-sectional schematic diagram, partially in block form, of a bidirectional surface communication subsystem in accordance with another embodiment of the invention.

FIG. 6 shows an embodiment of the invention for use in conjunction with a top drive 605. In the FIG. 6 example, a saver sub 440, coupled with the topmost wired drill pipe 181, has inductive couplers at both ends, connected by cable 441, as in the embodiments of FIGS. 4 and 5. A top drive sub 690 is provided between the top drive 605 and saver sub 440, and the wireless transceiver subsystem 630 of this embodiment is mounted on the top drive sub 690. Also in this embodiment, the top drive sub has an inductive coupler at its lower end, and internal cable 691 that runs from the inductive coupler to the subsystem 630. However, it will be understood that an external cable could be used, as in the FIG. 3 embodiment, or that the electronics and/or antenna(s) could be split, as in the FIG. 5 embodiment.

Figure 9:
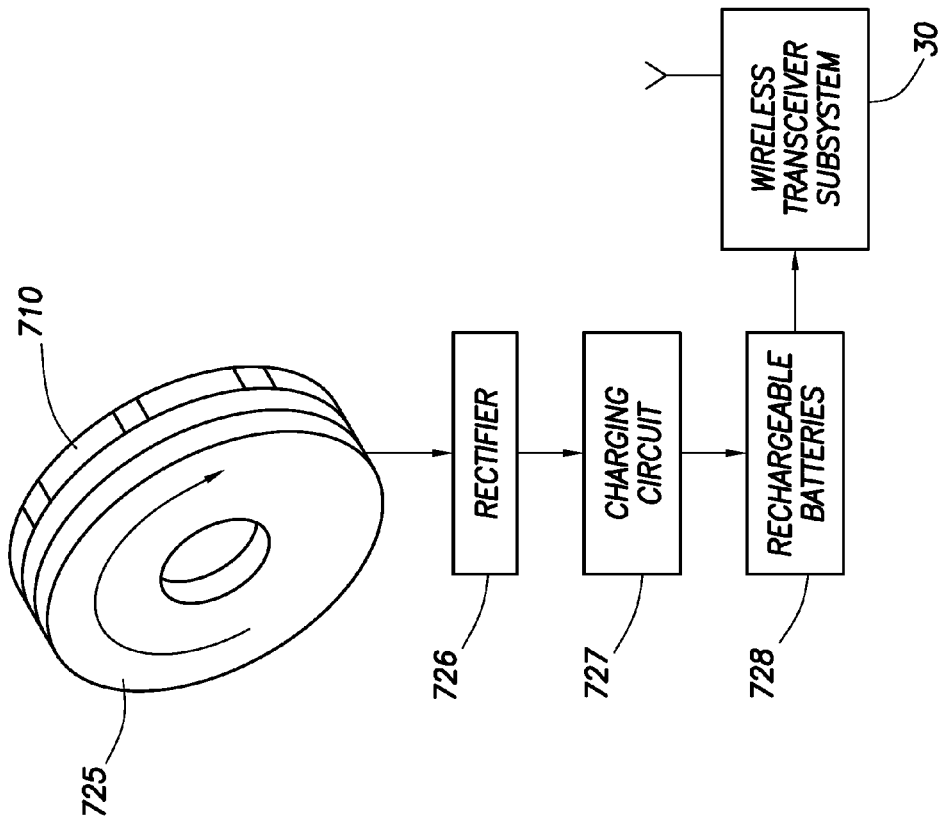
FIG. 9 is a schematic diagram, partially in block form, of the electric power generating subsystem of FIGS. 7 and 8, in accordance with an embodiment of the invention.

FIGS. 7-9 show an embodiment of a form of the invention wherein a safe and reliable source of power is provided on rotational components at the well site, which can be used, for example, to power the wireless transceiver subsystem 30 and/or for other applications. In this embodiment, a magnet ring 710 operates as a stationary generator component and is mounted on a stationary portion of the drilling rig represented at 705, for example a mounting adjacent a kelly or a top drive. A surface sub 720 (which may, for example, be one of the surface subs of FIGS. 3-6) includes a stator 725 (FIGS. 8 and 9), rectifier 726, charging circuit 727, and rechargeable batteries 728 (FIG. 9), which are used, inter alia, for powering the first transceiver subsystem 30. The stator 725 has one or more stator coils, is annularly aligned with the magnet ring, and is in close proximity therewith so that flux from the magnet ring crosses the one or more stator coils of the stator 725 as the stator 725 rotates with the drive string portion of the drill string. The magnet ring, in this embodiment, comprises magnets arranged with alternating polarities. The alternating current from the stator is rectified by rectifier 726, the output of which is direct current that is input to charging circuit 727, the output of which, in turn, charges rechargeable batteries 728. In an embodiment hereof, the batteries power the first wireless transceiver subsystem 30, and can also power other circuits, such as for measurement and/or communication. Also, it will be understood that the output of the generator and/or rectifier could, if desired, be used for directly powering circuits or subsystems of the equipment.

The invention has been described with regard to a number of particular preferred embodiments, but variation within the spirit and scope of the invention will occur to those skilled in the art. For example, although FIGS. 3-6 show various combinations of couplers, internal and external cabling, internal and/or external mounting of portions of the electronics, use of a saver sub(s) and/or special surface sub(s), etc., it will be understood that other combinations are possible and are contemplated within the scope defined by the claims. Also, while a wired drill pipe subsystem is one preferred embodiment of a drill string telemetry subsystem, it will be recognized that other forms of drill string telemetry, an example being acoustic drill string telemetry, can be used, in which case a transducer subsystem can be provided at the top of drill string telemetry subsystem to convert to/from electrical signals. Also, it will be understood that other techniques which make use of motion of the drill string, including rotational or vibrational motion, can be used to generate power in the region of the drill string.

What is claimed is:

1. For use in an operation of drilling an earth borehole using:
   a drilling rig, a drill string of drill pipes having its generally upper end mechanically coupleable with and suspendable from the drilling rig, a drive string portion of the drill string, mechanically coupleable with the topmost drill pipe of said drill string, and a drive mechanism mechanically coupleable with said drive string for rotating the drive string and the drill string;
   a system for generating electric power in the region of the drive string, comprising:
   an electric generator that includes a rotating generator component that is mounted on said drive string for rotation therewith, and
   a stationary generator component that is mounted on a stationary portion of the drilling rig, said rotating generator component producing electric power in the region of said drive string.

2. The system as defined by claim 1, wherein said stationary generator component comprises a ring of magnets.

3. The system as defined by claim 2, wherein said rotating generator component comprises at least one stator coil.

4. The system as defined by claim 3, wherein said rotating generator component and stationary generator component are disposed in close proximity such that magnetic flux from said ring of magnets crosses said at least one stator coil.

5. The system as defined by claim 1, further comprising a rechargeable battery charged by said electric generator, and mounted on said drill string.

6. The system as defined by claim 1, further comprising a drill telemetry subsystem forming at least a portion of a communication link between downhole equipment on the drill string and an uphole processor subsystem; and
   wherein said electric power from said electric generator is adapted to provide power for said communication link.

7. The system as defined by claim 4, further comprising a drill telemetry subsystem forming at least a portion of a communication link between downhole equipment on the drill string and an uphole processor subsystem; and
   wherein said electric power from said electric generator is adapted to provide power for said communication link.

8. The system as defined by claim 1, further comprising:
   a system for bidirectional communication between a downhole equipment and a processor subsystem at the earth's surface, comprising a section of wired drill pipes comprising at least the upper portion of the string of drill pipes, and forming at least a portion of a bidirectional communication link between the downhole equipment and the top of the string of drill pipes;
   a first wireless transceiver subsystem mounted on said drive string portion of the drill string, for rotation in conjunction with the drill string, said first wireless transceiver subsystem being coupled with said section of wired drill pipe; and
   a second wireless transceiver subsystem coupled with said uphole processor subsystem, said second wireless transceiver subsystem communicating bidirectionally with said first wireless transceiver subsystem; and wherein said electric power from said electric generator is adapted for use by said first transceiver subsystem.

9. For use in an operation of drilling an earth borehole using: a drilling rig, a drill string of drill pipes having its generally upper end mechanically coupleable with and suspendable from the drilling rig, a drive string portion of the drill string, mechanically coupleable with the topmost drill pipe of said drill string, and a drive mechanism mechanically coupleable with said drive string for rotating the drive string and the drill string; a method for generating electric power in the region of the drive string, comprising the steps of: providing a power generating unit having a first component that is mounted on said drive string for movement therewith; and producing power in the region of said drive string from movement of said first component.

10. The method as defined by claim 9, wherein said step of producing power comprises producing electric power from vibration of said first component.

11. The method as defined by claim 9, further comprising mounting a second component on a stationary portion of the drilling rig, and wherein said step of producing power comprises producing power from relative movement of said first component with respect to said second component.

12. The method as defined by claim 11, wherein said relative movement comprises rotation of said first component with respect to said second component.

* * * * *